United States Patent
Willis et al.

(10) Patent No.: US 8,078,564 B2
(45) Date of Patent: Dec. 13, 2011

(54) CONTROLLING FORWARD CHAINING EXECUTION IN A RULES SYSTEM

(75) Inventors: Jurgen A. Willis, Woodinville, WA (US); Donald J. McCrady, Redmond, WA (US); John A. Rummell, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/785,935

(22) Filed: May 24, 2010

(65) Prior Publication Data

US 2011/0066583 A1    Mar. 17, 2011

Related U.S. Application Data

(63) Continuation of application No. 11/511,774, filed on Aug. 29, 2006, now Pat. No. 7,752,153.

(51) Int. Cl.
G06F 17/00 (2006.01)
G06N 5/02 (2006.01)
G06N 5/04 (2006.01)

(52) U.S. Cl. .......................................... 706/48; 706/50
(58) Field of Classification Search .................. 706/47
See application file for complete search history.

(56) References Cited

U.S. PATENT DOCUMENTS

| | | | |
|---|---|---|---|
| 5,119,470 A | 6/1992 | Highland |
| 5,265,193 A | 11/1993 | Grady |
| 5,481,647 A | 1/1996 | Brody |
| 5,619,621 A | 4/1997 | Puckett |
| 5,778,402 A | 7/1998 | Gipson |
| 6,125,359 A | 9/2000 | Lautzenheiser |
| 6,145,120 A | 11/2000 | Highland |
| 6,662,235 B1 | 12/2003 | Callis |
| 6,847,957 B1 | 1/2005 | Morley |
| 2004/0019678 A1 | 1/2004 | St. Pierre |
| 2004/0172445 A1 | 9/2004 | Singh |
| 2005/0096946 A1 | 5/2005 | Janakiraman |
| 2005/0240546 A1 | 10/2005 | Barry |

FOREIGN PATENT DOCUMENTS

WO    WO2005117549 A2    12/2005

OTHER PUBLICATIONS

Lohman, et al., Extensions to Starburst: Objects, Types, Functions, and Rules, Communications of the ACM [online], Oct. 1991 [retrieved on Apr. 28, 2011]. Retrieved from the Internet:<URL:http://delivery.acm.org/10.1145/130000/125266/p94-lohman.pdf?key1=125266&key2=1889104031&coll=DL&dl=ACM&ip=151.207.246.4&CFID=18371726&CFTOKEN=24177273>.*

Chu, Wei-Han, "Generic Expert System Shell for Diagnostic Reasoning", pp. 7-12, Year of Publication: 1988, ACM Press, New York, USA, pp. 7-12.

Feldman, Ronen, "FRST—An Interactive Revision System for Forward Chaining Rule Bases", 1994, pp. 1-17.

(Continued)

*Primary Examiner* — Jeffrey A Gaffin
*Assistant Examiner* — Nathan Brown, Jr.

(57) ABSTRACT

Detailed herein is a technology which, among other things, provides for forward chaining in a ruleset. In one approach to this technology, a first rule is examined, to identifying a data object associated with it. A second rule is identified, also associated with the data object. The relationship between the two rules is determined, where execution of the second rule will modify the data object, which, in turn, will alter the outcome of the first rule.

11 Claims, 4 Drawing Sheets

OTHER PUBLICATIONS

Gordin, et al., "Set-oriented Constructs for Rule-based Systems", 1991, pp. 1-5.

Hatala, et al., "Intelligent Visualization of Inner Behaviour for Encode", Oct. 1996, 2 pages.

O'Connor, et al., "Supporting Rule System Interoperability on the Semantic Web with SWRL", 2005, 15 pages.

Vick, et al., "Verification and Validation of Rulebased Systems for Hubble Space Telescope Ground Support", 1988, pp. 435-448.

Vick, "Vitae of Shon Douglas Vick", 1996, 6 pages.

Randall Davis, et al., "An Overview of Production Systems", 1975, 43 pages.

Wang et al., "MRL: A Real-time Rule-based Problem System", 1990, pp. 267-276.

Non-Final Rejection, U.S. Appl. No. 11/511,774, dated Oct. 7, 2008, 14 pages.

Amendment to Non-Final Rejection, U.S. Appl. No. 11/511,774, dated Jan. 6, 2009, 13 pages.

Final Rejection, U.S. Appl. No. 11/511,774, dated Apr. 22, 2009, 12 pages.

Amendment to Final Rejection, U.S. Appl. No. 11/511,774, dated Jun. 16, 2009, 10 pages.

Non-Final Rejection, U.S. Appl. No. 11/511,774, dated Oct. 2, 2009, 11 pages.

Amendment to Non-Final Rejection, U.S. Appl. No. 11/511,774, dated Dec. 16, 2010, 6 pages.

Notice of Allowance and Fees Due (PTOL-85), U.S. Appl. No. 11/511,774, dated Feb. 25, 2010, 16 pages.

* cited by examiner

Flowchart 300

Flowchart 400

CONTROLLING FORWARD CHAINING EXECUTION IN A RULES SYSTEM

CROSS-REFERENCE TO RELATED APPLICATIONS

This application claims priority to and is a continuation of U.S. patent application Ser. No. 11/511,774 entitled "Forward Chaining and Identifying Rule Dependencies and Rule Triggering Side Effects in Terms of Data Objects Accessed by Rules in a Ruleset" and filed Aug. 29, 2006 now U.S. Pat. No. 7,752,153, which is incorporated herein by reference.

BACKGROUND

Embodiments pertain to the field of rules application for computer systems, and, more particularly, to an approach for allowing controlled forward chaining within a ruleset.

In a multistep process, be it a large-scale business transaction, or a simple sale of goods, a number of rules govern the process. Often, these rules can be represented as if/then (or if/then/else) statements: if A occurs, then do B (or else do C). When some or all of the steps in the process occur on a computer, or when a computer program is used to support the process, these rules can be aggregated into a ruleset.

In many situations, however, the rules performed during a process will affect other rules. For example, consider the two rules presented below, in Table 1:

TABLE 1

Rule 1: IF OrderValue > 1000
   THEN HighValueOrder = true
Rule 2: IF HighValueOrder == true
   THEN Discount = 5%

Rule 1 simply states that if the value of the OrderValue variable is greater than 1000, then set the HighValueOrder variable equal to true. Rule two states that if HighValueOrder is equal to true, then sets the Discount variable equal to 5%. In business terms, rules 1 and 2 represent a 5% discount for a larger order, a fairly common occurrence.

A problem arises in attempting to automate a set of rules, or ruleset, where one rule may rely upon the outcome of another rule. Rule 2, as shown above, should be reevaluated every time Rule 1 is performed; more complicated rulesets may involve interrelationships between many more rules, such that the outcome of the application of one rule will affect other rules indirectly. More complex processes may involve different rulesets at different times, or may change rulesets with every step.

SUMMARY

Detailed herein is a technology which, among other things, allows for forward chaining within a ruleset. The dependencies and side effects of each rule in the ruleset are determined, in terms of the data objects which are accessed by each rule. The relationships between rules can then be identified, such that the rules which modify a data object upon which other rules depend are known. Execution of those rules can then trigger reevaluation of the dependent rules, in a process called forward chaining.

In one approach, a rule is examined, and the side effects of execution of that rule are identified. Other rules are then located, where the outcome of those rules will be influenced by the side effects of the first rule. These relationships are stored. When the first rule is executed, and the side effects occur, those other rules can be reevaluated, in light of the side effects of the first rule.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

DETAILED DESCRIPTION

Figure 1:
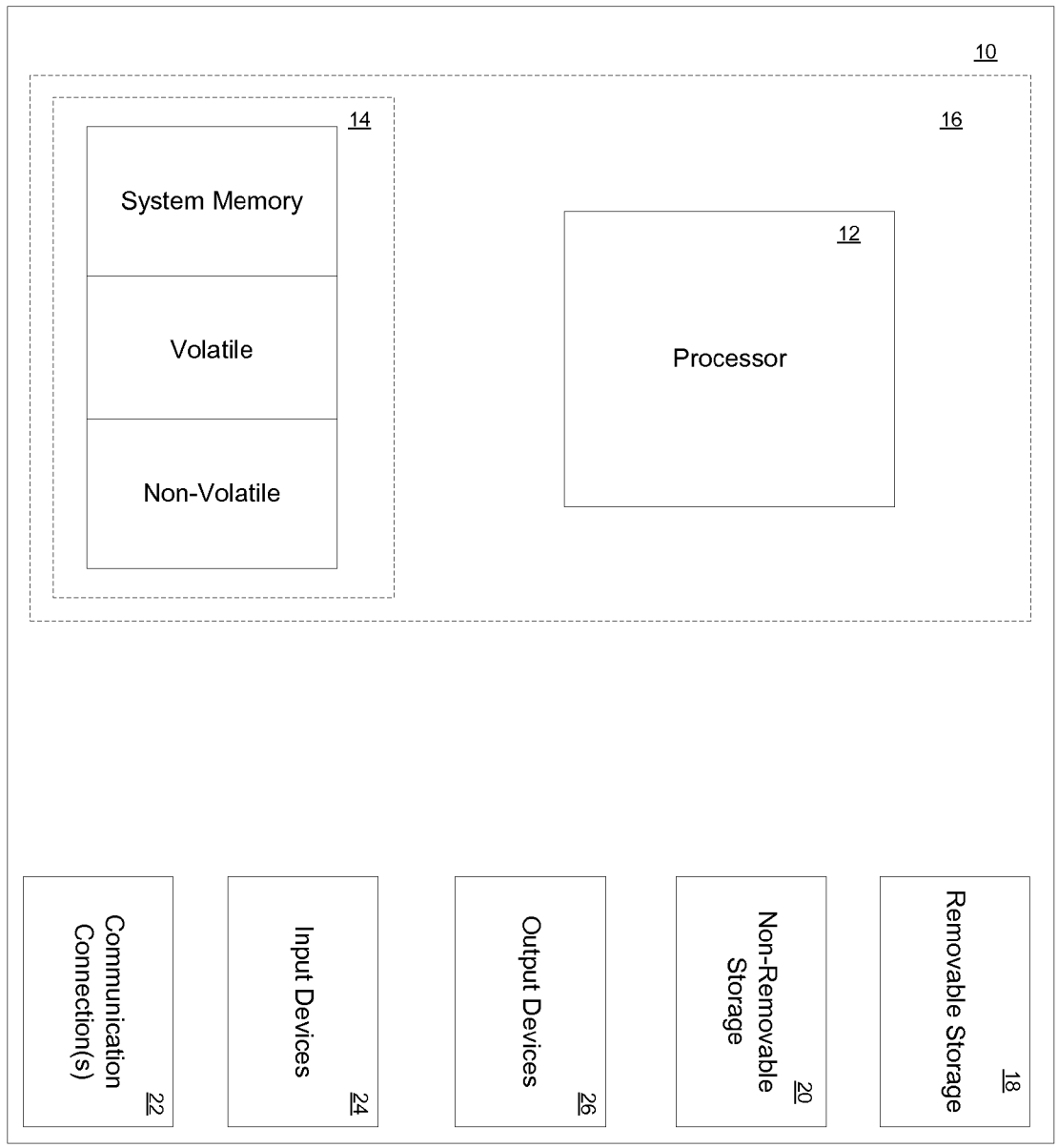
FIG. 1 is a block diagram of an exemplary computing system upon which embodiments may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 3) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system environment 10, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Basic Computing Device

With reference to FIG. 1, an exemplary system for implementing embodiments includes a general purpose computing system environment, such as computing system environment 10. In its most basic configuration, computing system environment 10 typically includes at least one processing unit 12 and memory 14. Depending on the exact configuration and type of computing system environment, memory 14 may be volatile (such as RAM), non-volatile (such as ROM, flash memory, etc.) or some combination of the two. This most basic configuration is illustrated in FIG. 1 by dashed line 16.

Additionally, computing system environment 10 may also have additional features/functionality. For example, computing system environment 10 may also include additional storage (removable and/or non-removable) including, but not limited to, magnetic or optical disks or tape. Such additional storage is illustrated in FIG. 1 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and nonremovable storage 20 are all examples of computer storage media.

Computing system environment 10 may also contain communications connection 22 that allow it to communicate with other devices. Communications connection 22 is an example of communication media.

Computing system environment 10 may also have input device(s) 24 such as a keyboard, mouse, pen, voice input device, touch input device, etc. Output device(s) 26 such as a display, speakers, printer, etc. may also be included. Specific embodiments, discussed herein, combine touch input devices with a display, e.g., a touch screen. All these devices are well known in the art and need not be discussed at length here.

Data Objects

Many different types of data objects can be manipulated to the application of a ruleset. In one embodiment, for example, a workflow type data object is manipulated. In another embodiment, different data objects are handled. A single data object, like workflow, can be composed of multiple "smaller" data objects. Each smaller object may, in turn, also include multiple objects, and so on. In some embodiments, the combination of the smaller data objects make up the entirety of the larger data object, while in other embodiments, this is not the case.

Figure 2:
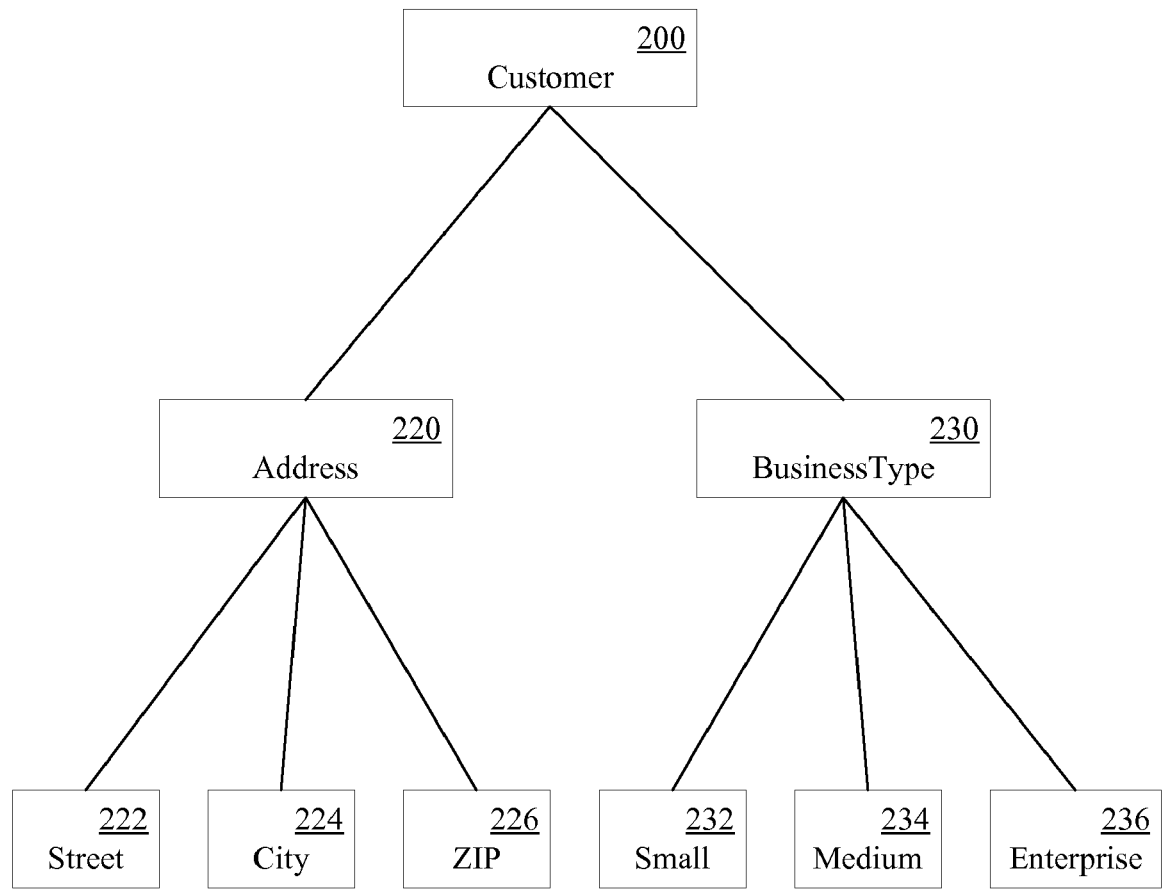
FIG. 2 is an example hierarchical data object, in accordance with one embodiment.

With reference now the FIG. 2, an example hierarchical data object is presented, in accordance with one embodiment. While FIG. 2 depicts a hierarchical data object comprising multiple, distant elements, it is understood that embodiments are well suited to applications involving many different types of data objects. Moreover, it is understood that FIG. 2 depicts a representation of a data object; FIG. 2 does not purport to reflect how a data object may be stored or manipulated within a computer system.

FIG. 2 shows customer object 200. Customer object 200, as shown, includes a selection of additional data objects, of the sort likely to be useful for processing a customer transaction. These additional data objects, as shown, are arranged in a hierarchy, such that multiple related data objects are grouped beneath a single, "higher" data object, which in turn is beneath the top-level data object, customer object 200.

Customer object 200 is shown as including data object address 220. Address 220, in turn, includes street 222, city 224, and ZIP 226. Customer object 200 is also shown as including data object business type 230, which in turn includes small 232, medium 234, and enterprise 236. As shown, both address 220 and business type 230 are part of customer object 200; accordingly, each of the data objects that make up address 220 and business type 230 are also part of customer object 200. A change to, for example, ZIP 226, therefore means that customer object 200 has been changed.

In the descriptions that follow, the hierarchical relationship between data objects, such as those shown in FIG. 2, will be expressed using a concatenation representation, e.g., the relationship of ZIP 226 to customer object 200 and address 220 can be depicted as customer.address.zip. Wildcards can also be used to represent an entire level of the hierarchy, e.g., customer.address.* would include all of the data objects that make up address 220, e.g., St. 222, city 224, and ZIP 226.

Relationships Between Rules

Rules may interrelate in a number of ways. One relationship involves direct reference of the same data object, where one rule explicitly depends on a data object, and the execution of another rule explicitly alters the data object. This is shown below, in Table 1 (reprinted), with the relationship between rules 1 and 2. Rule 1 alters the HighOrderValue data object, which rule 2 relies upon as part of its conditional statement.

TABLE 1

(Reproduced)

Rule 1: IF OrderValue > 1000
    THEN HighValueOrder = true
Rule 2:IF HighValueOrder == true
    THEN Discount = 5%

The relationship between rules may also be implicit, e.g., one or more of the related rules does not explicitly call a data object, but rather invokes some method or function which manipulates the data object. This is shown below, in Table 2. Rule 1 still sets the value of data object HighValueOrder, but rule 3 does not explicitly rely upon that data object. Instead, rule 3 invokes a method, IsHighValueOrder( ) which is presented as a method 4. Method 4 does rely upon HighValueOrder, and so consequently so does rule 3.

TABLE 2

Rule 1: IF OrderValue > 1000
    THEN HighValueOrder = true
Rule 3: IF IsHighValueOrder( ) == true
    THEN Discount = 5%
Method 4:
private bool IsHighValueOrder( )
{
    return HighValueOrder;
}

Rules may also interact through the passing of parameters, e.g., during method calls. In some embodiment, methods may be passed parameters as part of their invocation. This is shown below, in Table 3. Rule 5 upgrades in much the same manner as rule 1, above; the major difference is that a method is called, SetHighValueOrder, which takes as a parameter a Boolean value. The method uses the passed parameter to set a value for the data object HighValueOrder. This, in turn, relates method 6 to rule 2.

TABLE 3

Rule 5: IF OrderValue > 1000
    THEN SetHighValueOrder(true)
Method 6:
private void SetHighValueOrder( bool value)
{
    HighValueOrder = value;
}
Rule 2: IF HighValueOrder == true
    THEN Discount = 5%

Method Attributes

In some embodiments, methods or functions included in or invoked by the ruleset may include certain attributes. In several such embodiments, method attributes are used to aid in determining dependency or side effect information for rules which call the method or function. In other embodiments, other approaches to determining dependency or side effect information for rules which invoke methods or functions are utilized. In some such embodiments, for example, the source code or generated code for the method or function may be examined, to determine which data objects are affected by the method or function, and in what ways.

In some embodiments, a number of method attributes are available. In some embodiments, an attribute can be used to indicate that a method reads from a particular data object. In several such embodiments, knowing that a method reads from a particular data object may indicate that rules which invoke that method depend on that data object. Table 4, below, depicts such a method. Method 7 has the RuleRead attribute set, to indicate that method 7 reads the HighValueOrder data object.

TABLE 4

Method 7:
[RuleRead("HighValueOrder")]
private bool IsHighValueOrder( )
{
    return HighValueOrder;
}

In some embodiments, an attribute can be used to indicate that the method writes to a particular data object. In several such embodiments, knowing that a method of rights to a particular data object may indicate that rules which invoke that method has the side effect of modifying that data object. Table 5, below, depicts such a method. Method 8 has the RuleWrite attribute set, to indicate that method 8 writes to the HighValueOrder data object.

TABLE 5

Method 8:
[RuleWrite("HighValueOrder")]
private void SetHighValueOrder( bool value)
{
    HighValueOrder = value;
}

In some embodiments, an attribute can be used to indicate that a method invokes another method. In several such embodiments, this allows evaluation of dependencies and side effects across multiple method invocations, to determine whether data objects are read from or written to in any of those methods. Table 6, below, depicts such linked methods. Method 9 has the RuleInvoke attribute set, which indicates that method 9 calls the IsHighValueMediumBusinessOrder( ) method (here, method 11), and also the IsEnterpriseOrder( ) method (here, method 10). Method 10 has the RuleRead attribute set, indicating that it reads from the data object CustomerType, while method 11 has the RuleRead attribute set, as it reads from HighValueOrder. The net effect, in some embodiments, is that any rule which invokes method 9 will read from both CustomerType and HighValueOrder.

TABLE 6

Method 9:
[RuleInvoke("IsHighValueMediumBusinessOrder")]
[RuleInvoke("IsEnterpriseOrder")]
private Bool IsHighValueOrder( )
{
    return (this.IsEnterpriseOrder( ) ||
    this.IsHighValueMediumBusinessOrder( );
}

TABLE 6-continued

```
Method 10:
    [RuleRead("CustomerType")]
    private bool IsEnterpriseOrder( )
```

```
{
    return CustomerType == BusinessCategory.Enterprise;
}
Method 11:
    [RuleRead("HighValueOrder")]
    private bool IsHighValueMediumBusinessOrder( )
    {
        return (HighValueOrder && customerType ==
        BusinessCategory.Medium);
    }
```

In some embodiments, additional attributes can be used to affect methods.

Rule Engine

In some embodiments, a rule engine is implemented. In some embodiments, a function of the rule engine is to examine a ruleset, and identify the relationships between different rules, e.g., based upon the data objects that are manipulated by the rules. In some further embodiments, the rule engine performs a forward chaining function, such that, when one rule is executed, other rules that are linked to that rule by a common data object are reevaluated.

Figure 3:
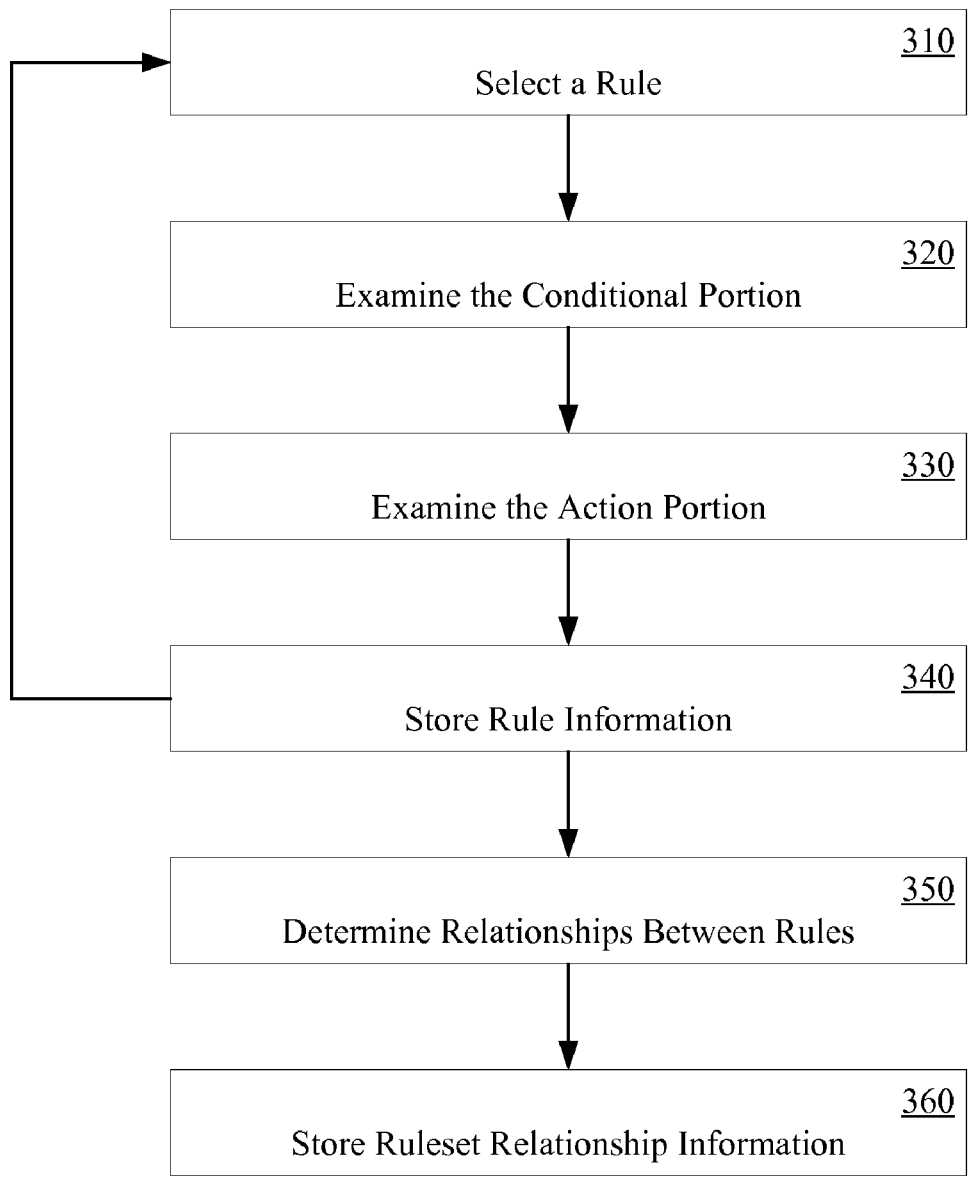
FIG. 3 is a flowchart of a method of examining a ruleset, in accordance with one embodiment.

With reference now to FIG. 3, a flowchart 300 of a method of examining a ruleset is presented, in accordance with one embodiment. Although specific steps are disclosed in flowchart 300, such steps are exemplary. That is, embodiments are well suited to performing various other (additional) steps or variations of the steps recited in flowchart 300. It is appreciated that the steps in flowchart 300 may be performed in an order different than presented, and that not all of the steps in flowchart 300 may be performed.

With reference to step 310, a rule engine selects a rule from a ruleset to examine.

With reference now to step 320, the rule engine examines the conditional portion of the selected rule. The conditional portion of the rule, in some embodiments, provides the dependencies of the rule, those data objects upon which the rules operation depends. In some embodiments, dependencies are analogous to reading in a particular data object. In some embodiments, a change in a dependency may trigger different behavior from the rule; accordingly, if a dependency changes, the rule may need to be reevaluated.

With respect to step 320, in some embodiments the rule engine examines explicit references of data objects. Any data object which is explicitly called as part of the conditional statement of the rule can be automatically detected.

In some embodiments, the rule engine detects implicit references of data objects, e.g., data objects referenced by a method or function call. In some embodiments, functions or methods may be tagged, attributed, or otherwise identified as being related to certain data objects; this is described in greater detail, below. In some embodiments, functions or methods are evaluated by the rule engine as well, to detect explicit or implicit references of data objects; this can allow the rule engine, for example, to detect a reference to the data object through multiple levels of method or function calls.

In some embodiments, the rule engine detects dependencies on data objects which are used as a parameter to a method or function call. If the conditional portion of the rule invokes a method, and passes a parameter to the method, the rule engine may determine if a dependency on a particular data object is present.

With reference now to step 330, the rule engine examines the action portion of the selected rule, to identify any side effects, or changes made to data objects as a result of the execution of the rule. In some embodiments, side effects are analogous to writing to a particular data object. The action portion of the rule, in some embodiments, indicates which data objects should be altered or modified as a result of performing the rule. In some embodiments, the action portion of a rule consists of the then statement; in some embodiments, the action portion consists of the else statement; and other embodiments, the action portion encompasses both the then and the else statements.

With respect to step 330, in some embodiments the rule engine that examines explicit references of data objects. Any data object which is explicitly modified as part of the action statement of the rule can be automatically detected.

In some embodiments, the rule engine detects implicit modification of data objects, e.g., data objects modified by an invocation of a method or function call in the action portion of the rule. In some embodiments, functions or methods may be tagged or otherwise identified as being modifying certain data objects; this is described in greater detail, below. In some embodiments, functions or methods are evaluated by the rule engine as well, to detect exquisite or implicit manipulation of data objects; this can allow the rule engine, for example, to detect an alteration to a data object through multiple levels of method or function calls.

In some embodiments, the rule engine detects modifications to data objects which are used as a parameter to a method or function call. If the action portion of the rule invokes a method, and passes a parameter to the method, the rule engine may determine if an alteration to particular data object results.

In some embodiments, a rule can include an "update" action, to indicate to the rules engine that a side effect of executing the rule is a change in a data object. This is described in greater detail, below.

With reference now to step 340, the information about the selected rule is stored. In some embodiments, such storage is accomplished in a short-term, volatile matter. In some embodiments, information about the selected rule is stored in nonvolatile storage.

Steps 310 to 340, in some embodiments, repeat, until every rule in a particular ruleset has been examined, and information about the dependencies and side effects of every rule in the ruleset has been obtained.

With reference now to step 350, the relationships between rules are determined. In some embodiments, the rule engine analyzes the dependencies and side effects of each rule in the ruleset, in order to determine the interrelationship between rules. If a first rule is dependent on a given data object, and a side effect of a second rule modifies that data object, those two rules are linked. In some embodiments, execution of the second rule should trigger a reevaluation of the first rule.

With reference now to step 360, the relationships governing the ruleset are stored. In some embodiments, the relationships are stored in a volatile matter, e.g., cached. In several such embodiments, the cached relationships are discarded when the ruleset is no longer in use. In some embodiments, the relationships are stored in a nonvolatile matter, e.g., a nonvolatile storage. In several such embodiments, the stored relationships can be loaded the next time the rule engine is invoked.

In some embodiments, the method of flowchart 300 is performed when a rule engine instance is first created, e.g., when a process reaches a step that requires a particular ruleset, a rule engine is created for that ruleset. In some embodiments, the method of flowchart 300 is performed once, and the relationships governing the ruleset are stored, and can be used for future invocations of the rule engine and ruleset. In some embodiments, the method of flowchart 300 is performed when a rule engine instance is created, and the resulting relationship governing the ruleset is cached while the ruleset is in use; other invocations of the ruleset or rule engine can make use of the cached relationship information while the rule engine is active.

Forward Chaining Behavior

In some embodiments, the relationship information governing the operation of a ruleset is used to implement forward chaining Forward chaining, in some embodiments, involves reevaluating a rule, when the dependencies for that rule are altered by the operation of another rule.

Figure 4:
FIG. 4 is a flowchart of a method of performing forward chaining, in accordance with one embodiment.

With reference now to FIG. 4, a flowchart 400 of a method of performing forward chaining is presented, in accordance with one embodiment. Although specific steps are disclosed in flowchart 400, such steps are exemplary. That is, embodiments are well suited to performing various other (additional) steps or variations of the steps recited in flowchart 400. It is appreciated that the steps in flowchart 400 may be performed in an order different than presented, and that not all of the steps in flowchart 400 may be performed.

With reference now to step 410, a first rule is executed. In some embodiments, the first rule is executed by a rule engine.

With reference now to step 420, execution of the first rule results in a side effect. In some embodiments, side effects include alteration of a data object.

With reference now to step 430, an affected rule is identified. In some embodiments, an affected rule is dependent upon a data object which was altered as a side effect of executing the first rule. In some embodiments, identifying an affected rule is accomplished by examining the relationship information governing the operation of ruleset.

With reference now to step 440, the affected rule is reevaluated. In some embodiments, alteration or modification of a data object that the affected rule is dependent upon may alter the outcome of the rule's evaluation. Therefore, in some embodiments, when a dependency is modified, the affected rule or rules should be reevaluated.

Constraining Chaining Behavior

In some embodiments, it is sometimes desirable to put constraints on forward chaining behavior. Under certain circumstances, it is possible for looping behavior to result from unconstrained forward chaining. This is illustrated below, in Table 7. Rule 12 is dependent upon a data object OrderTotal, and a side effect of rule 12 is the modification of the data object ShippingCharge. Rule 13 is dependent on the data object ShippingCharge, and a side effect of rule 13 is the modification of the data object OrderTotal. If unconstrained forward chaining is allowed, evaluation of rule 12 will trigger a reevaluation of rule 13, which will in turn trigger evaluation of rule 12 again, which will again trigger rule 13, and so on. The resulting loop will continue infinitely, and will also produce an infinitely large order total.

TABLE 7

Rule 12: IF OrderTotal > 100
   THEN ShippingCharge = 5.00
   ELSE ShippingCharge = 10.00

TABLE 7-continued

Rule 13: IF ShippingCharge > 0
   THEN OrderTotal = OrderTotal + ShippingCharge

In some embodiments, several different approaches are used to constrain undesirable forward chaining behavior.

In one embodiment, a "chaining behavior" property can be defined for a ruleset. This chaining behavior property governs forward chaining for rules in the ruleset. In one embodiment, the chaining behavior property has several possible values.

When the chaining behavior property is sent for "full", forward chaining is unconstrained in that ruleset. In some embodiments, unconstrained forward chaining is the preferred behavior. In several such embodiments, the rules in the ruleset may be written in such manner as to avoid infinite loops or undesirable looping behavior. In other embodiments, individual rules may be identified in a manner which prevents undesirable forward chaining, without inhibiting forward chaining across the remainder of the ruleset; this is described in greater detail, below.

When the chaining behavior property is set to "update only", forward chaining is, by default, prevented. Individual rules can be identified which will cause forward chaining behavior to occur, with respect to affected rules; this is described in greater detail, though. In some embodiments, any rule not so identified will not cause forward chaining to occur upon execution.

When the chaining behavior property is set to "never", forward chaining is prevented.

In some embodiments, a "reevaluation behavior" property can be defined for a specific rule. The reevaluation behavior property governs forward chaining, with respect to that particular rule. In some embodiments, a reevaluation behavior property has several possible values.

When a reevaluation behavior property for a particular rule is set to "always", no constraints are set, with respect to forward chaining and that particular rule. A value of always indicates that the rule should be reevaluated whenever indicated by the dependencies for that rule.

When a reevaluation behavior property for particular rule is set to "never", that particular rule will not be reevaluated, once that rule has performed some action. If, for example, the rule has previously executed some non-empty collection of "then" or "else" actions, then that rule will not be reevaluated, even if the dependencies for that rule or altered.

In some embodiments, a reevaluation behavior property for a specific rule is subject to the chaining behavior property for the ruleset. In several such embodiments, a combination of the reevaluation behavior property in the chaining behavior property is governed by Boolean logic; e.g., if the reevaluation behavior property is set to always, and the chaining behavior property is set to never, the rule will not be reevaluated; if the reevaluation behavior property is set to always, and the chaining behavior property is set to full, then the rule will be reevaluated; and so on. In other embodiments, the reevaluation behavior property overrides the chaining behavior property, such that the chaining behavior for particular rule is governed first by its reevaluation behavior property.

The Update Action

In some embodiments, an update action can be included in a rule. The update action, in some embodiments, serves two functions. First, the update action can indicate to a rule engine which data object or objects a particular rule modifies or alters. Second, the update action, in some embodiments, serves as an instruction to the rule engine. In several such embodiments, when a rule including an update action is executed, the rule engine is instructed to reevaluate rules which depend on that data object. Some embodiments incorporate one or the other of these functions; some embodiments utilize an update action for another reason; others omit the update action entirely.

Table 8, below, provides an example of a rule incorporating an update action. Rule 14 is dependent on the data object order.OrderValue, and has the side effect of setting the data object order.HighValueOrder. Rule 15, in turn, is dependent on order.HighValueOrder, and has the side effect of setting the data object order.Discount. However, rule 16 modifies the order data object, which means that it modifies every data object within the hierarchy of order, which will change the dependant data for both rules 14 and 15. Rule 16 includes an update action, Update("order"), which indicates to a rule engine that rule 16 has the side effect of modifying the order data object. Further, in some embodiments, where the chaining behavior property for the ruleset is set to "update" or "full" chaining, the rule engine is instructed that evaluation of rule 16 should trigger forward chaining

TABLE 8

Rule 14: IF order.OrderValue > 1000
    THEN order.HighOrderValue = true
Rule 15: IF order.HighValueOrder == true
    THEN order.Discount = 5%
Rule 16: IF supplementalOrder != null
    THEN order = supplementalOrder
    Update("order")

In some embodiments, other action tags can be used within rules, e.g., to affect how a rule engine interprets those rules. In other embodiments, additional attributes can be used and associated with rules, e.g., to affect how a rule engine interprets those rules.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of performing forward chaining in a ruleset to be performed on a computing system, the computing system comprising a processor and a memory, the method comprising:
defining a chaining behavior property of the ruleset that governs forward chaining for a plurality of rules of the ruleset, the chaining behavior property having a value of one of full, update only or never, wherein the ruleset comprises a first rule of the plurality of rules of said ruleset, the first rule dependent upon a first data object;
using the processor, executing the first rule;
identifying a second rule of the plurality of rules of the rules set in which execution of the second rule would affect the first data object, the second rule dependent upon a second data object, the second data object was affected by execution of the first rule;
if the value of the chaining behavior property is set to full, reevaluating the second rule;
if the value of the chaining behavior property is set to update only, preventing forward chaining, by default; and
if the value of the chaining behavior property is set to never, preventing forward chaining in the ruleset.

2. The method of claim 1, wherein if the chaining behavior property is set to update only identifying of one or more rules for which forward chaining behavior is allowed.

3. The method of claim 1, wherein dependency of the first rule upon the first data object comprises invoking a first method that is associated with said first data object and an attribute, wherein said first method comprises invoking a second method, and wherein said second method is associated with said first data object, said attribute indicating that said first method invokes said second method.

4. A method of performing forward chaining in a ruleset to be performed on a computing system, the computing system comprising a processor and a memory, the method comprising:
using the processor, executing a first rule of a plurality of rules of said ruleset, the first rule dependent upon a first data object;
identifying a second rule of the plurality of rules of the rules set in which execution of the second rule would affect the first data object, the second rule dependent upon a second data object, the second data object was affected by execution of the first rule, the second rule comprising a reevaluation behavior property that governs forward chaining with respect to the second rule, the reevaluation behavior property having a value of one of always or never;
if the reevaluation behavior property is set to always, reevaluating the second rule; and
if the reevaluation behavior property is set to never, not reevaluating the second rule.

5. The method of claim 4, further comprising defining a chaining behavior property of the ruleset, wherein if the reevaluation behavior is set to always, reevaluating the second rule is further based on the chaining behavior property of the ruleset.

6. The method of claim 4, wherein dependency of the first rule upon the first data object comprises invoking a first method that is associated with said first data object and an attribute, wherein said first method comprises invoking a second method, and wherein said second method is associated with said first data object, said attribute indicating that said first method invokes said second method.

7. A computer-readable storage medium, the computer-readable storage medium not consisting of a propagating signal, the computer-readable storage medium having computer-executable instructions for performing steps comprising:
defining a chaining behavior property of the ruleset that governs forward chaining for a plurality of rules of the ruleset, wherein the ruleset comprises a first rule of the plurality of rules of said ruleset, the first rule dependent upon a first data object;
using the processor, executing the first rule;
identifying a second rule of the plurality of rules of the rules set in which execution of the second rule would affect the first data object, the second rule dependent upon a second data object, the second data object was affected by execution of the first rule; and
reevaluating the second rule based upon the chaining behavior property.

8. The computer-readable storage medium of claim 7, wherein the chaining behavior property provides for unconstrained full forward chaining in the ruleset.

9. The computer-readable storage medium of claim 7, wherein the chaining behavior property provides for prevention of forward chaining of the ruleset.

10. The computer-readable storage medium of claim 7, wherein the chaining behavior property provides for identification of the second rule.

11. The computer-readable storage medium of claim 7, wherein dependency of the first rule upon the first data object comprises invoking a first method that is associated with said first data object and an attribute, wherein said first method comprises invoking a second method, and wherein said second method is associated with said first data object, said attribute indicating that said first method invokes said second method.

* * * * *